Figure 1:
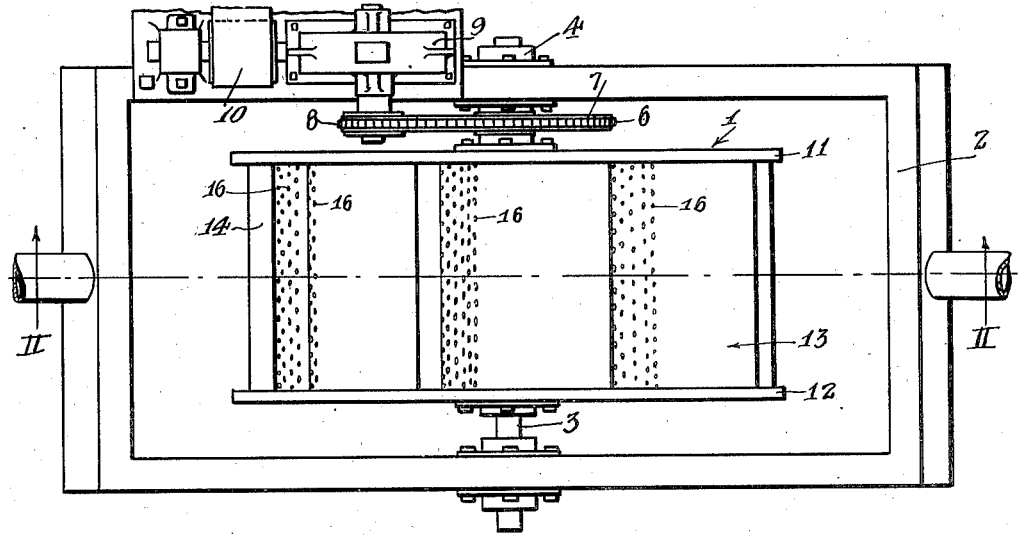

Oct. 27, 1936.  R. F. GOUDEY ET AL  2,058,785
AERATOR
Filed July 7, 1933   2 Sheets-Sheet 1

Inventors
Raymond F. Goudey
Schuyler M. Bennett
Harold R. Bennett
By Lyon & Lyon
Attorneys

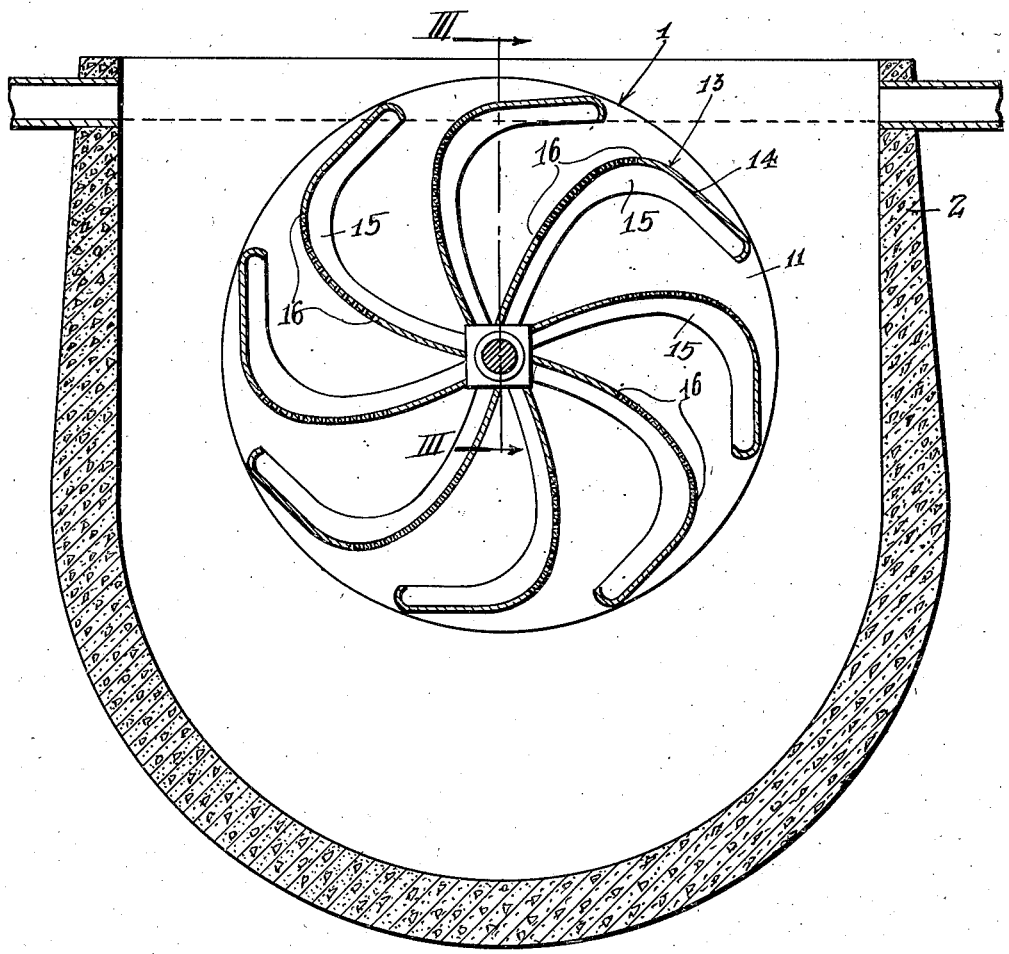

Patented Oct. 27, 1936

2,058,785

UNITED STATES PATENT OFFICE 2,058,785

AERATOR

Raymond F. Goudey, Schuyler M. Bennett, and
Harold R. Bennett, Los Angeles, Calif.

Application July 7, 1933, Serial No. 679,364

2 Claims. (Cl. 210—8)

This invention relates broadly to apparatus for aerating and agitating liquids and especially to apparatus for aerating and agitating sewage during reduction by the activated sludge process.

An object of the invention is to reduce the cost of aerating and agitating liquids.

Another object is to improve the efficacy of the activated sludge process for treating sewage.

A more specific object is to reduce the amount of power necessary to effectively aerate and agitate liquids.

Another specific object is to accelerate flocculation of sludge in the activated sludge process of treating sewage.

Still another object is to provide effective aeration of liquid in the tank while producing only gentle agitation in the main body of the tank. Such treatment when applied to the treatment of sewage by the activated sludge process has been found to yield large floccules of sludge, which remove colloids more rapidly than the small floccules which result when the sludges is kept broken up by violent agitation throughout the tank.

In acordance with the activated sludge method, sewage is reduced by bacterial, chemical and enzyme action to a flocculent sludge and a clear liquid, which can thereafter be separated by settling into a clear effluent and a concentrated sludge. The desired bacterial, enzyme and chemical action is obtained by aerating and agitating the sewage in the presence of previously produced activated sludge, while maintaining the liquid at a temperature conducive to the action. The process is old and well known and all the steps need not be described herein as the present invention relates only to improvements in the methods of and apparatus for agitating and aerating the mixture. (As herein used, the term "mixture" refers to the mixture of untreated sewage, activated sludge and clear liquid.)

Heretofore, to the best of our knowledge, it has been generally believed that most satisfactory results were obtained by violently agitating the mixture and introducing large amounts of air into it. Compressors were employed to force air through perforated plates in the walls or floors of the treating tanks below the liquid level and rapidly revolving paddles were provided to secure violent agitation throughout the tank or tanks. This required excessive amounts of power because (1) the efficiency of air compressors is relatively low, (2) the air was introduced a substantial distance below the liquid surface, requiring that it be injected at considerable pressure, (3) the air after being injected rose rapidly to the surface, thereby remaining in contact with the liquid only a very short time and necessitating the injection of excessive amounts of air in proportion to the oxygen actually absorbed by the liquid, and (4) considerable power was required to secure the rapid motion of the stirring paddles.

In accordance with the present invention, we have discovered that superior results may be obtained with the expenditure of much less power by eliminating rapidly moving paddles and providing as the sole agitating and aerating apparatus a specially designed wheel partly submerged in the mixture and rotated slowly about a horizontal axis, the wheel having curved vanes which entrap air at the surface, carry it below the surface and then release it through numerous perforations in the vanes in the form of small bubbles. The design of the wheel is such that the entrapped air is moved toward the axis of the wheel as it is carried down, thereby reducing the power necessary to turn the wheel; furthermore, a large part of the air released through the perforations in each vane is caught below the following vane and released again as small bubbles through the perforations in that vane, thereby maintaining the air in contact with the liquid for a long period of time by delaying its passage to the surface.

Figure 3:
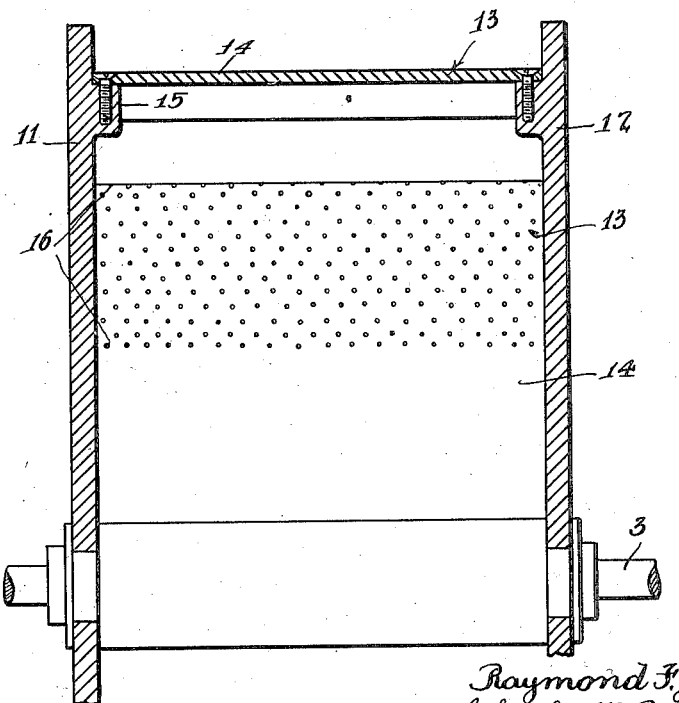

With a given amount of power, a given amount of air may be introduced below the surface of the liquid and maintained in intimate contact therewith for a longer period of time with our apparatus than with a compressor delivering air through jets in the wall or floor of the tank. Furthermore, we have found by experiment that our apparatus yields a more active sludge having larger floccules which not only shortens the time for complete reduction of the sewage but produces a sludge that separates more readily and rapidly from the clear liquid in which it is suspended. These superior results appear to be due, in part at least, to the fact that our apparatus produces a violent agitation of the mixture only adjacent the vanes where the air is released, the bulk of the mixture contained in the treating tank being agitated only sufficiently to keep the sludge from settling out. Our experience indicates that gentle agitation, except at the point of introduction of the air, is more conducive to the formation of large sludge floccules than violent agitation. Our apparatus will now be described in detail with reference to the drawings, in which Figure 1 is a plan view of a tank containing an aerating wheel in accordance with the invention;

Figure 2 is a vertical sectional view through the tank and wheel taken in the plane II—II of Figure 1; and Figure 3 is a vertical sectional view taken in the plane III—III of Figure 2.

Referring to the drawings, our apparatus comprises a wheel 1 adapted to be partly submerged in liquid contained in a tank 2 and mounted for rotation on a horizontal shaft 3. The shaft 3 may be supported in bearings 4 and secured to the walls of the tank as shown in the drawings or, if desired, the bearings may be supported entirely within the tank. Wheel 1 is rigidly attached to the shaft 3 for rotation therewith and the shaft itself is adapted to be rotated through a sprocket wheel 6 secured to the shaft at one side of the wheel 1. Thus, the sprocket wheel 6 may be turned by a chain 7 driven through a second sprocket wheel 8 positioned above the tank and rotated through a gear reduction box 9 by a motor 10. Of course, any desired method may be employed for rotating the shaft 3.

The wheel 1 comprises a pair of circular end plates 11 and 12, respectively, to which there are secured vanes 13 which extend substantially from the center of the wheel to the periphery thereof and form fluid-tight connections with the end plates 11 and 12. The vanes 13 may be constructed in any desired manner but as shown in the drawings comprise sheet metal elements 14 secured at the ends to curved cleats 15 which in turn are rigidly secured to the end plates 11 and 12. As clearly shown in Figure 2, each vane 13 extends substantially radially from the center of the wheel and then forwardly in the direction of rotation of the wheel so as to form a concave forward face. The extreme end of each vane element 14 is turned inwardly toward the axis of the wheel to entrap air as the wheel rotates.

Thus, as shown clearly in Figure 2, when the wheel 1 is rotated in a clockwise direction, the tip of each vane in its uppermost position extends slightly above the liquid level so that as the tip of the vane again enters the liquid it entraps a substantial amount of air below the vane. As the vane continues to revolve, this body of entrapped air is moved inwardly along the vane toward the center of the wheel, and at the same time is carried down below the surface of the liquid. A substantial portion 16 of the area of each vane extending inwardly from the approximately tangential portion thereof is provided with numerous small perforations through which the air escapes in the form of small bubbles which pass upwardly through the liquid. The perforations may be of various sizes but we have found that in the aeration of sewage and activated sludge the perforations should be approximately one-sixteenth ($\frac{1}{16}$th) of an inch in diameter. The perforations are sufficiently small relative to the volume of air trapped below each vane to prevent release of substantially all of the air until the vane has reached a position in which the perforated portion thereof is substantially horizontal.

It will be observed from Figure 2 that the vanes overlap each other and they move downwardly through the liquid so that a substantial portion of the air escaping through the perforations in each vane collects below the following vane and is again carried downwardly through the liquid before it is released through the apertures in the following vane. In the actual operation of the device, the same air may be intercepted by several successive vanes before it finally escapes to the surface of the liquid.

In the treatment of sewage by the activated sludge process, a series of tanks contains wheels as described may be employed, the mixture of sewage and activated sludge flowing successively from tank to tank until the treatment is completed and all of the solids originally present in the sewage are converted into clear liquid and activated sludge. Alternatively, if desired, a plurality of wheels may be mounted at intervals spaced longitudinally in a single long tank in which the mixture to be treated flows continuously from one end to the other.

The wheel 1 is preferably revolved at a relatively slow speed which agitates the main body of mixture in the tank only sufficiently to maintain the sludge in suspension in the liquid. The only violent agitation occurs in and immediately adjacent the perforations in the vanes as the air more or less mixed with the liquid escapes through the perforations. This violent agitation immediately adjacent the point of contact between the air and the liquid promotes the oxygenation of the latter and is probably beneficial. However, we have found that greater agitation of the mixture throughout the tank is positively harmful as such treatment does not produce as large floccules of sludge as does the gentle agitation.

Very little power is required to rotate the wheel 1 because of the facts that (1) it is turned very slowly, (2) the air is moved inwardly toward the axis of the wheel as it is submerged, thereby increasing the leverage effect, and (3) air entrapped at the surface is carried only a relatively short distance below the surface. Furthermore, maintenance costs are very low because of the slow motion of the moving parts.

High efficiency is obtained from a given volume of air used because of the fact that the air is maintained in contact with the sewage for a long period of time. In old methods of aeration in which the air is merely introduced below the surface of the liquid and allowed to rise immediately to the surface, the time of contact of the air with the liquid is usually between one to five seconds. In our device a given volume of air may be successively carried downwardly through the liquid 8 or 10 times by succeeding vanes and the time of submersion of the air may be extended to over a minute. This long submergence of the air in the form of small bubbles gives a long period of time for the oxygen in the air to do its work and to have its end products removed. This results in greater use of a given amount of air so that a much smaller total amount of air is required to treat a given quantity of sewage.

The passage of the sewage and air together through the small perforations provides for a more intimate mixing of the air and sewage than can be obtained by other methods. In addition to the fact that the air is broken up into small bubbles, the sludge floccules in the sewage are broken up into fine particles. This maintains the sludge in more granular form and accelerates flocculation immediately after passing through the perforations.

It has been found that the large floccules resulting from gentle agitation of the mixture of sewage and sludge in the main portion of the tank remove colloids much faster and more completely than when the sludge is kept broken up by violent agitation. To the best of our knowledge, there is no other aeration unit in use today which provides sufficient aeration without relatively violent agitation throughout the treating tank. Our structure permits the use of much smaller aeration tanks which directly reduces the original cost of installation.

Although the speed of the wheel may be varied between relatively wide limits, we have obtained excellent results with a wheel of the form illustrated rotated at a speed of approximately one revolution per minute or less.

We are aware of the fact that it is not new broadly to aerate liquids by carrying air below the surface thereof in buckets or cups and releasing it. We have found by experiment, however, that such devices are quite useless in treating sewage as the air rises to the surface in very large bubbles at the time of releasing and is not broken up into small enough bubbles nor retained below the surface of the liquid long enough to serve any useful purpose. We have found it necessary to release the air gradually through small perforations in order to obtain the desired beneficial effect.

It is to be understood that many variations can be made in the structure disclosed without departing from the spirit of the invention and the invention is to be limited only as set forth in the appended claims.

We claim:

1. In apparatus for aerating a liquid contained in an open tank, a wheel rotatably mounted in the tank, and positioned to successively submerge different portions of the wheel in response to rotation of the wheel, means for rotating said wheel in a predetermined direction at a speed too low to produce any appreciable amount of splashing, said wheel comprising end walls and vanes extending from one end wall to the other, said end walls and vanes defining a plurality of chambers extending from the periphery of the wheel substantially to the center thereof, said vanes being curved forwardly at their outer ends whereby during rotation of the wheels they entrap air at the surface of the liquid and carry it below the surface, and said vanes having numerous small perforations therein whereby the entrapped air is gradually released therethrough as small bubbles during rotation of the wheel.

2. Apparatus as described in claim 1, in which only inner portions of said vanes spaced from the peripheries of the vanes are perforated.

RAYMOND F. GOUDEY.
SCHUYLER M. BENNETT.
HAROLD R. BENNETT.